United States Patent
Karsi

(10) Patent No.: US 7,411,896 B1
(45) Date of Patent: Aug. 12, 2008

(54) METHOD, APPARATUS, AND SYSTEM FOR POWER AMPLIFIER EFFICIENCY IMPROVEMENT

(75) Inventor: Murat F. Karsi, Encinitas, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 1085 days.

(21) Appl. No.: 10/230,018

(22) Filed: Aug. 28, 2002

Related U.S. Application Data

(60) Provisional application No. 60/315,823, filed on Aug. 29, 2001.

(51) Int. Cl.
*H04J 11/00* (2006.01)

(52) U.S. Cl. .................................. 370/208; 375/260

(58) Field of Classification Search ................ 370/203, 370/206, 208; 375/259, 260, 297, 320, 346
See application file for complete search history.

(56) References Cited

U.S. PATENT DOCUMENTS

| | | | |
|---|---|---|---|
| 5,914,933 A * | 6/1999 | Cimini et al. ............... | 370/208 |
| 6,301,268 B1 * | 10/2001 | Laroia et al. ................ | 370/481 |
| 6,351,832 B1 * | 2/2002 | Wei ............................ | 714/701 |
| 6,424,681 B1 * | 7/2002 | Tellado et al. ............... | 375/296 |
| 6,445,747 B1 * | 9/2002 | Jafarkhani et al. .......... | 375/285 |
| 6,757,299 B1 * | 6/2004 | Verma ........................ | 370/482 |
| 7,127,005 B2 * | 10/2006 | Wight ........................ | 375/296 |
| 7,151,804 B2 * | 12/2006 | Tong et al. .................. | 375/260 |
| 2003/0147655 A1 * | 8/2003 | Shattil ........................ | 398/182 |
| 2004/0141548 A1 * | 7/2004 | Shattil ........................ | 375/146 |

* cited by examiner

Primary Examiner—Wing F. Chan
Assistant Examiner—Duc T Duong
(74) Attorney, Agent, or Firm—Blakely Sokoloff Taylor & Zafman LLP

(57) ABSTRACT

According to one embodiment of the present invention, a method is provided in which a set of data symbols is partitioned into a plurality of subsets. The data symbols are used to modulate the sub-carriers that transmit data signals from a transmitter to a receiver. The subsets of the data symbols are assigned to the corresponding sub-carriers based on a predefined set of assignments. The assignment which results in the minimum PAPR is then chosen. The information identifying which assignment is used is communicated to the receiver which then uses this information to place the data symbols back to their true positions.

6 Claims, 8 Drawing Sheets

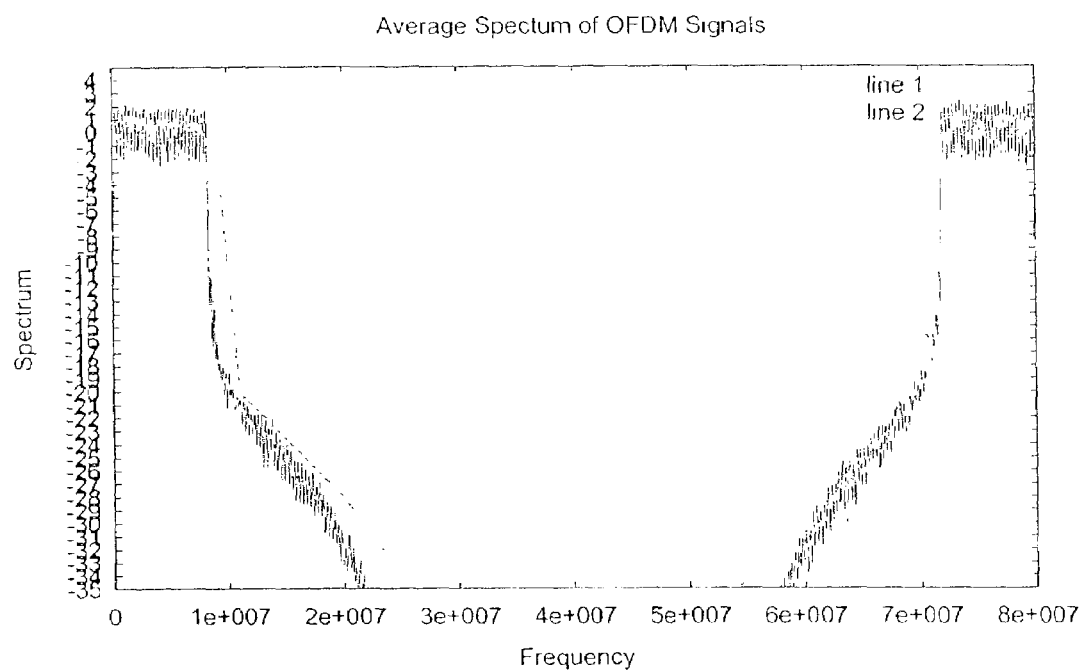
FIG. 4  Spectrum of OFDM Signal with 4 8 dB backoff with no signal conditioning

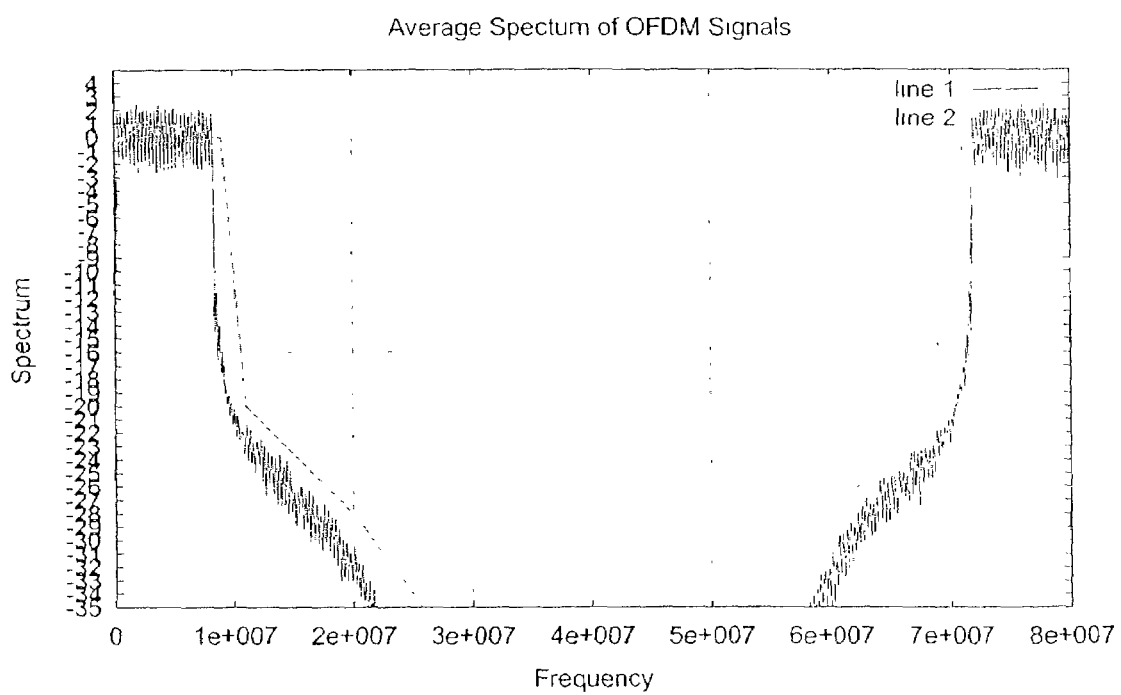
FIG. 5  Spectrum of OFDM Signal with 4.8 dB back-off with signal conditioning.

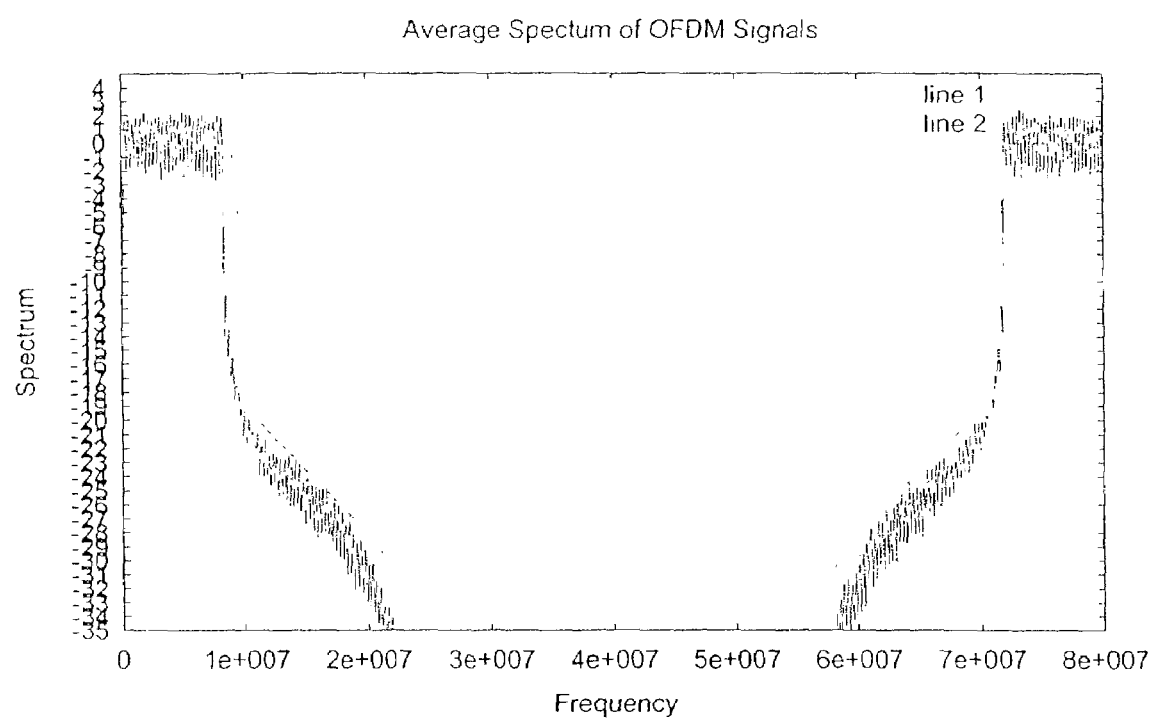
FIG. 6 Spectrum of OFDM Signal with 4.4 dB back-off with signal conditioning

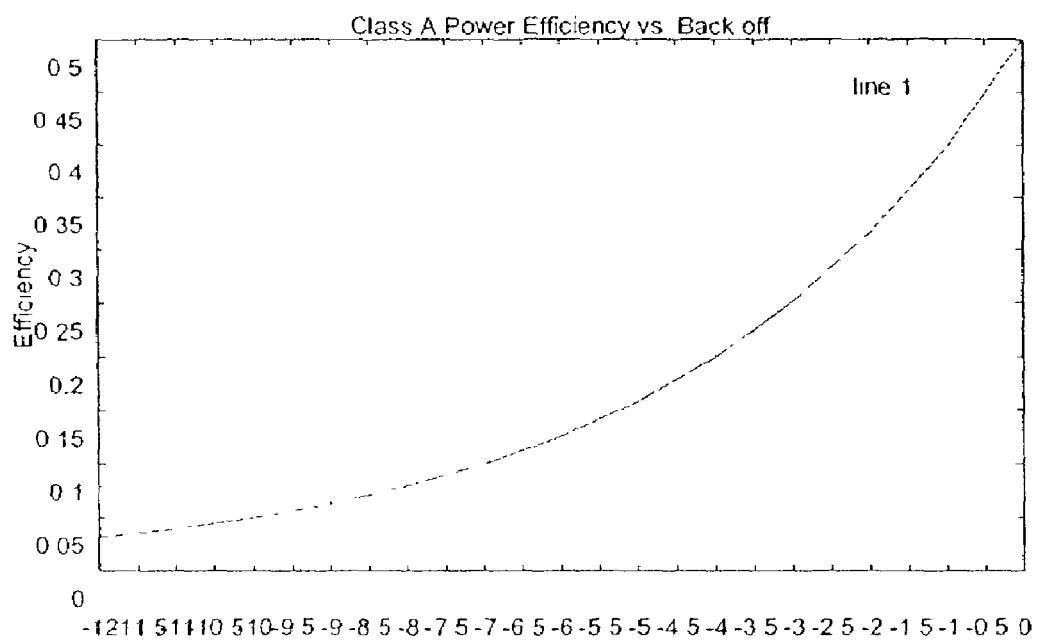
FIG. 7 Class A Amplifier Complexity vs. Back off

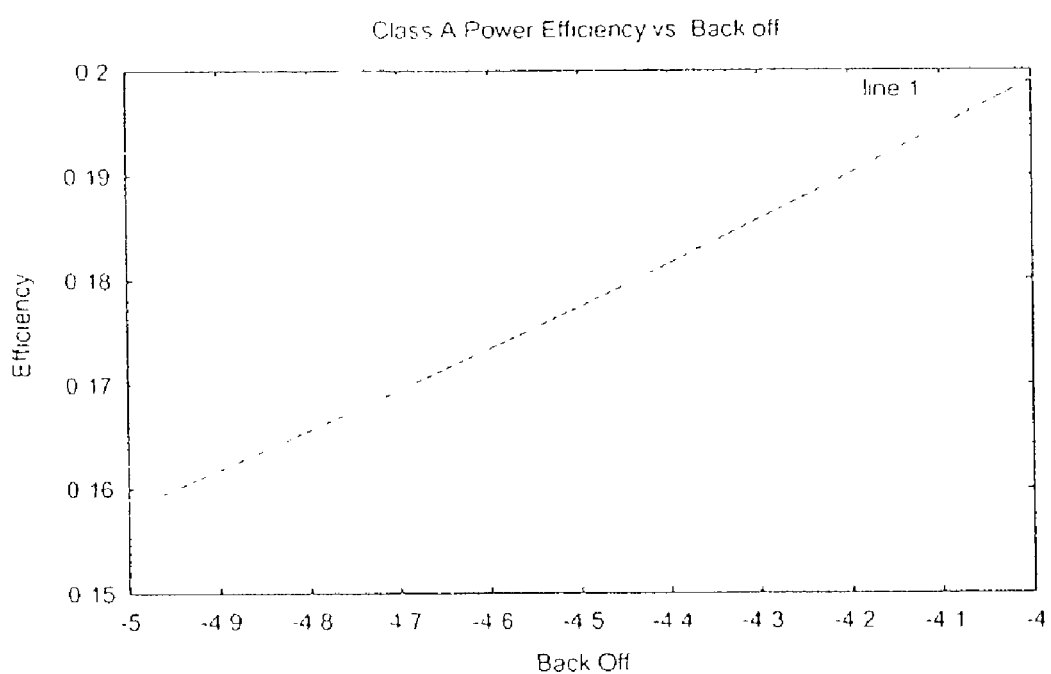
FIG. 8  Class A Amplifier Complexity vs. Back off, closer look.

METHOD, APPARATUS, AND SYSTEM FOR POWER AMPLIFIER EFFICIENCY IMPROVEMENT

RELATED APPLICATIONS

This application claims the benefit of U.S. Provisional Patent Application No. 60/315,823 filed on Aug. 29, 2001.

BACKGROUND (1) Field

The present invention relates to the field of signal processing and data communications. More specifically, the present invention relates to a method, apparatus, and system for improving power amplifier efficiency.

(2) General Background

In the past few years new, high technology communication products designed for consumers have offered lucrative business opportunities. As a result, significant efforts have been made towards development of technologies and products. Such products can include cellular phones, wireless local area networking cards, DSL cards, products providing Internet access through cable or satellite, etc.

Two important factors that contribute to the success of a consumer communication product are:

1. Cost of manufacturing. In the face of competition to reduce product prices, lower cost products have higher chance of success;

2. Power consumption of the end product. For wireless products such as a cellular phones or laptop computers, attractiveness of the product is very closely linked with the length of time the device can operate between battery recharges. In order to improve the battery life between recharges, it is necessary to reduce the power consumption of the product.

The power amplifier (PA) of a wireless transmitter is one of the system elements that is typically a stand alone component. In most applications, the PA module is purchased from a third party vendor and the cost of it is a significant contributor to the overall cost of the product. Also, power amplifiers typically consume significant power.

Given that a wireless transmitter should transmit at predetermined power levels, the portion of the power that a PA yields relative to the total power it absorbs from the battery is one of the key characteristics of a power amplifier. The ratio of PA output power relative to total power absorbed from the battery is called the efficiency of a power amplifier. In typical state of the art in PA systems, the efficiency of a power amplifier increases with increasing input signal power level. The maximum efficiency is reached at input levels that cause saturation of the power amplifier. The term saturation is used to describe the operating condition in which, the PA operation reached a point at which if the input level to the PA is increased, PA output signal level does not change, or, it changes slightly. In engineering jargon this is called "driving the PA to saturation".

Unfortunately, many modern communication signal formats do not lend themselves be transmitted through a transmitter that is driven to saturation. Specifically, modulation signals that do not have a constant envelope are significantly affected when passed through a non-linear transmitter. There are two main effects of a non-linear system on a non-constant envelope signal:

1. Reduction in signal quality: The transmitted information is encoded both in the amplitude and phase of a transmitted signal, and, distorting the amplitude of the signal leads to loss of quality of the transmitted signal.

2. Production of extra spectral components outside the bandwidth of signal: These extra spectral components may result in interfering in adjacent frequency channels if they are not filtered successfully before transmission. Typically the amount of extra spectral component that a transmitter can transmit at an adjacent channel is strictly regulated by standards that a transmitter should adhere to for obtaining a license for a product to be sold.

Several commercial consumer communication products utilize non-constant envelope modulation formats due to their high spectral efficiency. For example 2G and 3G Code Division Multiple Access (CDMA) cellular phone and Orthogonal Frequency Division Multiplexing (OFDM) wireless local area network (LAN) signals have significantly varying envelopes.

In order to reduce distortion to such signals, typically the input drive level is a kept a few decibels (dBs) less than the level that would have driven the PA to saturation. In communication systems engineering terminology, this is called "operating the PA in back off."

However, as we had mentioned earlier, the PA efficiency is low when it is driven at levels that are lower relative to saturation. This is one of the key problems with PA technology that prompted many studies and to which the present invention is directed to improve.

In efforts to improve efficiency of power amplifier following methods have been utilized:

1. PA bias level adaptation

2. Operating the PA with reduced back off. There are two alternative approaches:
   a. PA linearization
   b. Signal conditioning to reduce effects of PA non-linearity on signal.

PA Bias Level Adaptation

Typically, wireless communication applications have multiple power level modes of operation. It is a common technique to modify the power amplifier bias current to appropriate values at each required output power level. The saturation level at the output of a PA is dependent on the bias current. If the bias current is increased, the PA linear range increases, and, the PA can provide higher output power levels without distortion. However at the same time, the power consumption of the PA increases with increasing bias current. Thus, it is advantageous to keep the bias current as small as possible. Thus, for each output power level desired, the bias current is reduced as much as possible. The level that bias current can be reduced is determined also by the desired back off that the PA should operate relative to saturation. The required PA back off is chosen so as to reduce the distortion to the transmitted signal, and, out of band spectral emissions to acceptable levels.

Reduced Back Off

In efforts to improve PA efficiency one of the key design approaches is generally to find methods to reduce the amount of PA back off. Thus, the drive level of the power amplifier increased so that the PA will operate closer to saturation. However, a key problem with this approach is that, as the operation point gets close to saturation, the distortion introduced by the PA nonlinear characteristic increases.

To reduce the effects of reduced PA back off two methods are used:

Reduced Back Off with PA Linearization

PA Linearization techniques are used for compensating the non-linearity of the PA characteristics. These essentially correct the distortion introduced by the PA by means of various methods.

Reduced Back Off with Signal Conditioning

For typical communication signals used in modern applications, the instantaneous power of the modulated signal can be significantly higher relative to the average power level. Typically the variation of modulated signal around its average value is measured by a parameter called Peak to Average Power Ratio (PAPR). More precisely, PAPR is the ratio of power of a hypothetical signal that has the same amplitude as the peak instantaneous power of the signal divided by the average power of the signal. The larger PAPR ratio a communication signal has, the larger should the back off be relative to saturation. This is because, the signal can have large variations and if the peak values drive the PA into saturation, the distortions are introduced to the signal.

Signal conditioning involves reducing the PAPR of modulated signals. Several techniques have been proposed in the literature for this purpose. These include, 1. Various flavors of signal peak clipping.

2. Designing error control codes that lead to signals with reduced PAPR.

3. Designing algorithms to manipulate the data stream from which the modulated signal is derived to yield reduced PAPR.

As explained and discussed above, there are certain disadvantages and shortcomings with respect to the current techniques and approaches that are used to improve PA efficiency. Accordingly, there exists a need for a better method and apparatus for improving power amplifier efficiency in data communication devices and systems such as wireless communication devices and networks which operate according to the Institute of Electrical and Electronic Engineers (IEEE) 802.11 wireless communication standard, published Nov. 16, 1998. The invention described herein fits into the third category of signal conditioning techniques mentioned above.

BRIEF DESCRIPTION OF THE DRAWINGS

FIG. 4 illustrates an example of a spectrum of OFDM signal with 4.8 dB backoff with no signal conditioning;

FIG. 5 shows an example of a spectrum of OFDM signal with 4.8 dB backoff with signal conditioning according to one embodiment of the invention;

FIG. 6 shows an example of a spectrum of OFDM signal with 4.4 dB backoff with signal conditioning according to one embodiment of the invention;

FIG. 7 shows an exemplary efficiency chart of a class A amplifier complexity vs. back off; and FIG. 8 illustrates a closer look of the exemplary efficiency chart shown in FIG. 8.

DETAILED DESCRIPTION OF THE INVENTION

Figure 1:
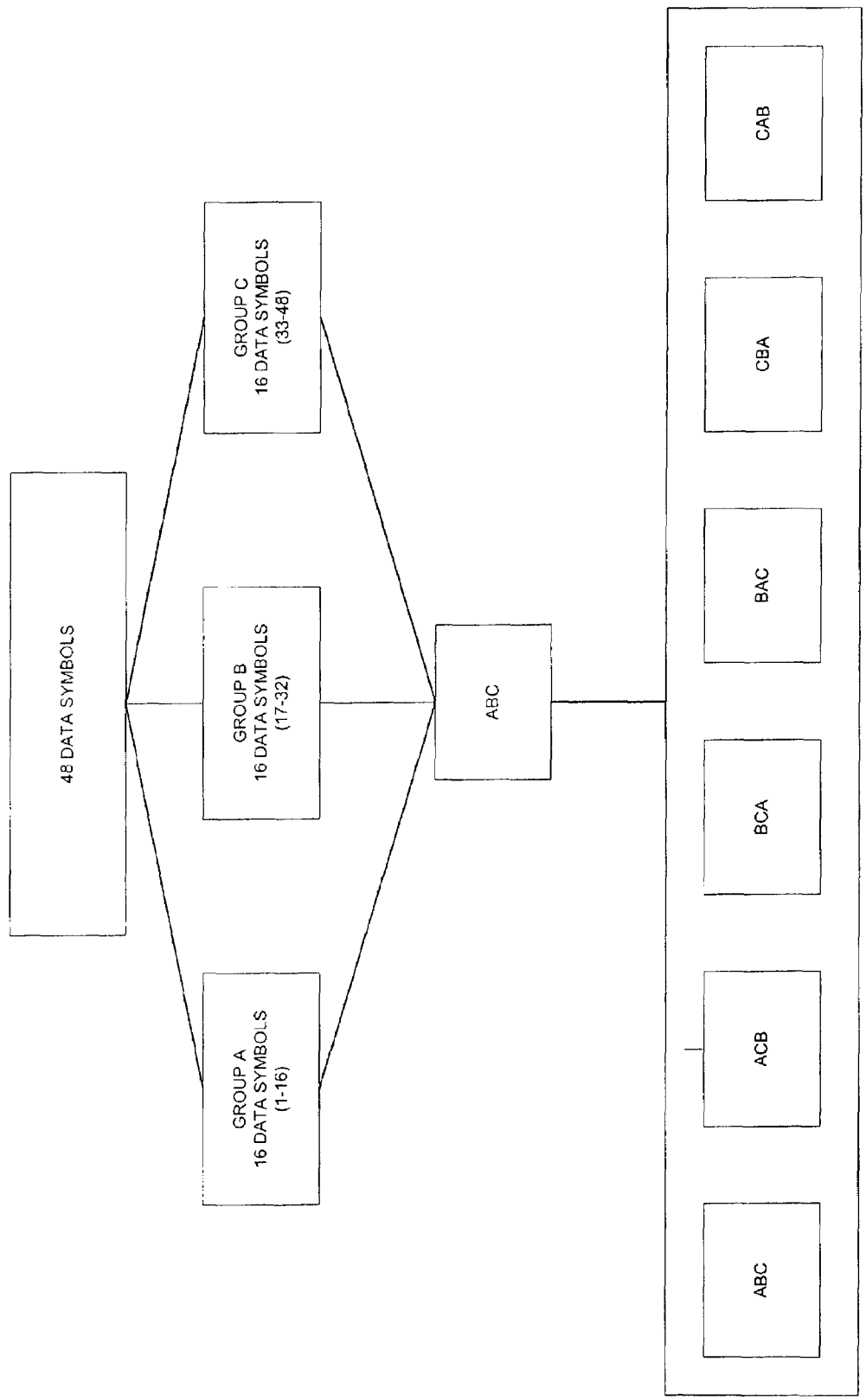
FIG. 1 shows an example of data symbols partitioning in accordance with one embodiment of the invention.

In the following detailed description numerous specific details are set forth. However, it is understood that embodiments of the invention may be practiced without these specific details.

In one embodiment, the teachings of the invention can be applied to Orthogonal Frequency Division Multiplexing (OFDM) signaling protocol for IEEE 802.11a Wireless LAN system. OFDM modulation method fundamentally involves transmitting multiple sub-carriers simultaneously. In other words, OFDM utilizes multiple sub-carriers to transmit information from one device (e.g., a transmitter in a wireless LAN) to another device (e.g., a receiver in a wireless LAN). According to the IEEE 802.11a standard, there are 52 sub-carriers of which 4 are pilot sub-carriers and 48 are sub-carriers that carry data. Each of the sub-carriers is modulated with data symbols using Quadrature Amplitude Modulation (QAM) technique. That is, they carry in phase and quadrature information symbols. The phase of each transmitted sub-carrier is determined by the un-modulated phase of the sub-carrier and the phase of the QAM symbol that the sub-carrier is used to carry. As multiple carriers with different frequencies are transmitted, typically signal envelope obtained by the addition of sub-carriers stay close to its average value. However, there may be time intervals where the carrier amplitudes add constructively and the instantaneous signal level reaches very high levels. Thus, the PAPR value of an OFDM symbol may be very high. According to the teachings of the invention, this problem can be solved as described in details below.

In one embodiment, the data symbols that are used to QAM modulate the sub-carriers are partitioned into several sub-groups (also called subsets herein) and the order in which these sub-groups are assigned to sub-carriers is changed. Among a predefined set of assignments, the one that leads to minimum peak is chosen. In one embodiment, there are several predefined assignments of data symbols to sub-carriers, and, these are known to both of the transmitter and the receiver. The transmitter sends information that identifies the particular assignment being used to the receiver. The receiver, upon being furnished with this information, places the data symbols back to their true positions. In one embodiment, the signaling of which assignment is used is transmitted by either embedded into the OFDM symbol itself or it may be transmitted in a separate channel. The partitioning of data symbols, the assignments of data symbols to sub-carriers, and the communication of which assignments are used are described in greater detail below.

Alternative Assignment Techniques:

In one embodiment, the assignment of data symbols can be made over the data symbols that will go into a single OFDM symbol, or, over a segment of data symbol stream that will be transmitted with multiple OFDM symbols. Below we generally describe the assignment technique for assignment of data symbols that will go into a single OFDM symbol. It should be understood and appreciated by one skilled in the art that the same concepts described herein will apply to assignment of data symbols in a longer segment.

In one embodiment, for the 802.11a OFDM application, 48 data symbols are generally mapped to sub-carriers. In one embodiment, as shown in FIG. 1, the 48 symbols can be partitioned into 3 groups (also called subsets) with same number of members. For example, Group A contains data symbols 1 through 16, Group B contains data symbols 17 through 32, and Group C contains data symbols 33 through 48. The original sequence then can be represented by ordered placement of group names together as ABC. Different assignments of the data symbols can then be listed as ABC, ACB, BCA, BAC, CBA, and CAB. Thus there are six different assignments.

Figure 2:
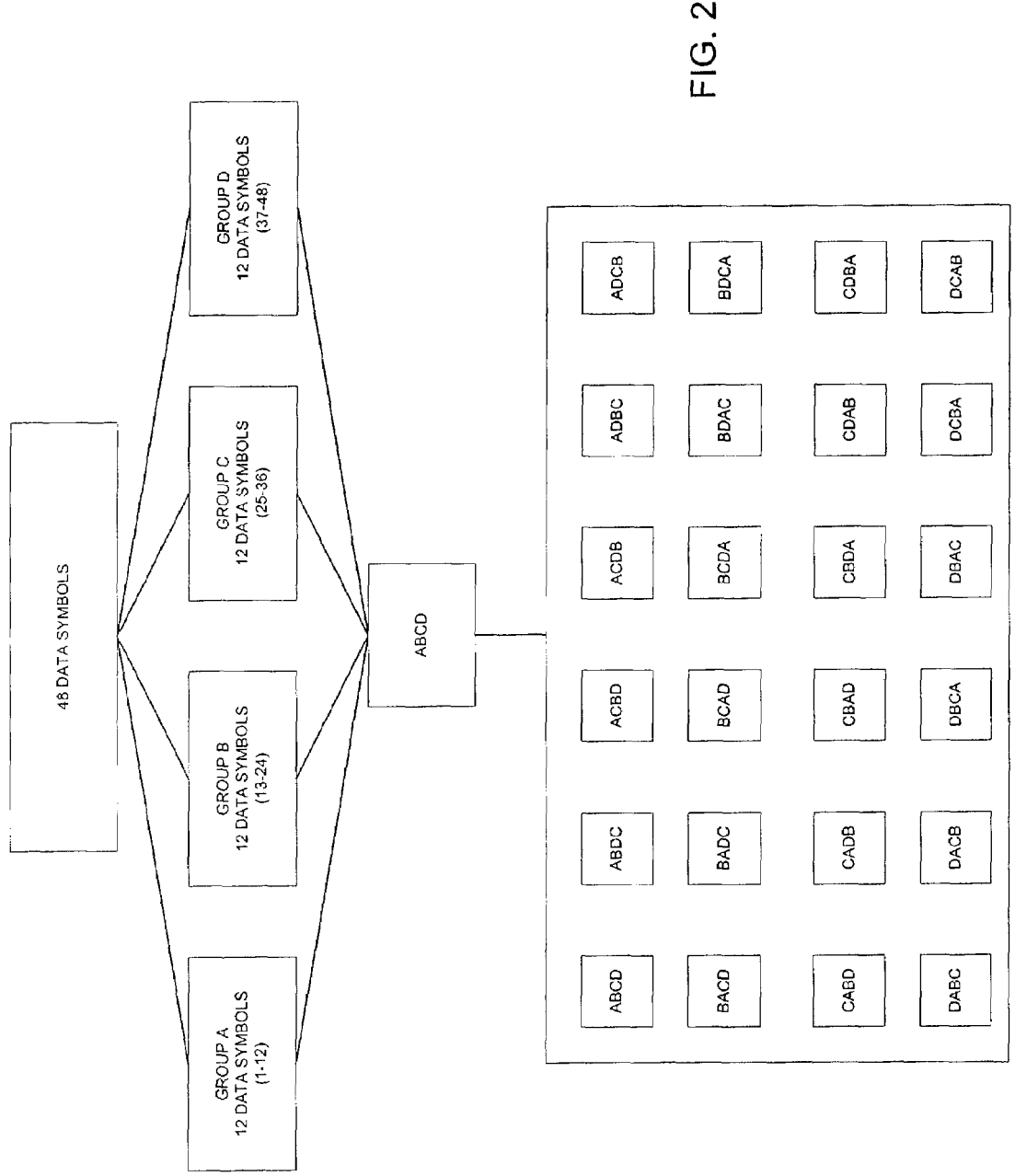
FIG. 2 shows another example of data symbols partitioning in accordance with one embodiment of the invention.

As another example, the same method of assignment can be used to partition the 48 symbols into 4 groups, as shown in FIG. 2. In this example, Group A contains data symbols 1 through 12, Group B contains data symbols 13 through 24, Group C contains data symbols 25 through 36, Group D contains data symbols 37 through 48. The original sequence then can be represented by ordered placement of group names together as ABCD. Different ordering of the data symbols can then be listed as:

ABCD, ABDC, ACBD, ACDB, ADBC, ADCB,

BACD, BADC, BCAD, BCDA, BDAC, BDCA,

CABD, CADB, CBAD, CBDA, CDAB, CDBA,

DABC, DACB, DBCA, DBAC, DCBA, DCAB.

In this example, there are twenty four (24) different assignments.

It should be understood and appreciated by one skilled in the art that there are other alternative ways of assignment as well and that the teachings of the present invention are fully applicable to the other alternative ways of assignment. The advantage of the above ordering is to be able to easily read the data sequentially once the start of a beginning address of a group is reached. Alternatively, vector reading of data in a group can also be done.

Choosing the Best Assignment.

In one embodiment, as mentioned above, the assignment with the minimum peak is chosen to reduce PAPR which improves the PA efficiency. The choice of assignment can be implemented as follows:

1. In one embodiment, for all candidate assignments:

a) Assigning data symbols to sub-carriers over the data segment being utilized;

b) Performing an Inverse Discrete Fourier Transform (IDFT) on the respective data segment;

c) Measuring the peak level of the IDFT output; and d) Choosing the assignment with smallest peak.

2. In another embodiment, an algorithm is used that estimates or determines the peak value of the signal that would be obtained without performing the IDFT. Based on data symbols, the assignment that will have minimum peak is determined directly. Once the assignment is determined, a single IDFT operation is necessary to obtain the signal to be transmitted.

The calculation of signal peak value obtained by different assignments can be calculated in either parallel or sequential manners, based on various applications and implementations of the invention.

It should be noted that IDFT or IFFT are equivalently usable in the operations described above. IFFT is an efficient implementation of IDFT.

Transmission of Assignment Index:

In one embodiment, the information on which particular assignment scheme is being used at the transmitter is sent to the receiver. This information can be sent in several ways:

1. If the assignment of data symbols to sub-carriers is done within an individual OFDM symbol, the assignment information can either be sent embedded in each of the OFDM symbols, or alternatively, the assignment information for multiple OFDM symbols can be put together and sent in a separate OFDM symbol.

In one embodiment, the information about which particular assignment is being utilized is transmitted with a given number of bits. With n bits, $2^n$ different ways of assignments can be identified. Thus, along with above mentioned ordering schemes, other orderings so as to utilize the capability of $2^n$ ways of transmission can be utilized. For example, with 3 bits, 8 different ways of assignment can be identified. Instead of choosing the 6 assignments obtained above by different orderings of 3 segments of data symbols, one could choose 8 suitable candidates from the 24 assignments obtained above by different orderings of 3 segments of data symbols.

2. If assignment of data symbols to sub-carriers are made by reordering a segment of the data symbol stream that is longer than number of symbols that can be held in a single OFDM symbol, the assignment information for such a segment can be sent embedded in one of the OFDM symbols, or alternatively, information about multiple such segments can be sent together in one or more dedicated OFDM symbols(s).

Transmission of the assignment index introduces an overhead that has to be carried by OFDM symbols. However, this overhead is relatively small. For example, consider the case where the assignment with smallest peak value is chosen among the candidates. Only 3 bits is sufficient to carry information about which particular assignment is being utilized. The relative overhead for each modulation modes can be calculated by finding the ratio of the number of bits used for assignment information in an OFDM symbol and the total number of bits in an OFDM symbol. The overhead will be highest for 6 Mbps BPSK (binary phase shift keying) mode where there is only one bit of information transmitted for each sub carrier. The overhead for this mode is $(3/48) \times 100 = 6.25\%$. However, for faster data rates the overhead is significantly reduced. For example for the 54 Mbps 64 QAM transmission, 6 bits are transmitted with each sub-carrier and the overhead is $(3/(6 \times 48)) \times 100 = 1.04\%$.

3. Alternatively, the information about which assignment is being utilized can be sent over any other channel available between the transmitter and the receiver.

Figure 3:
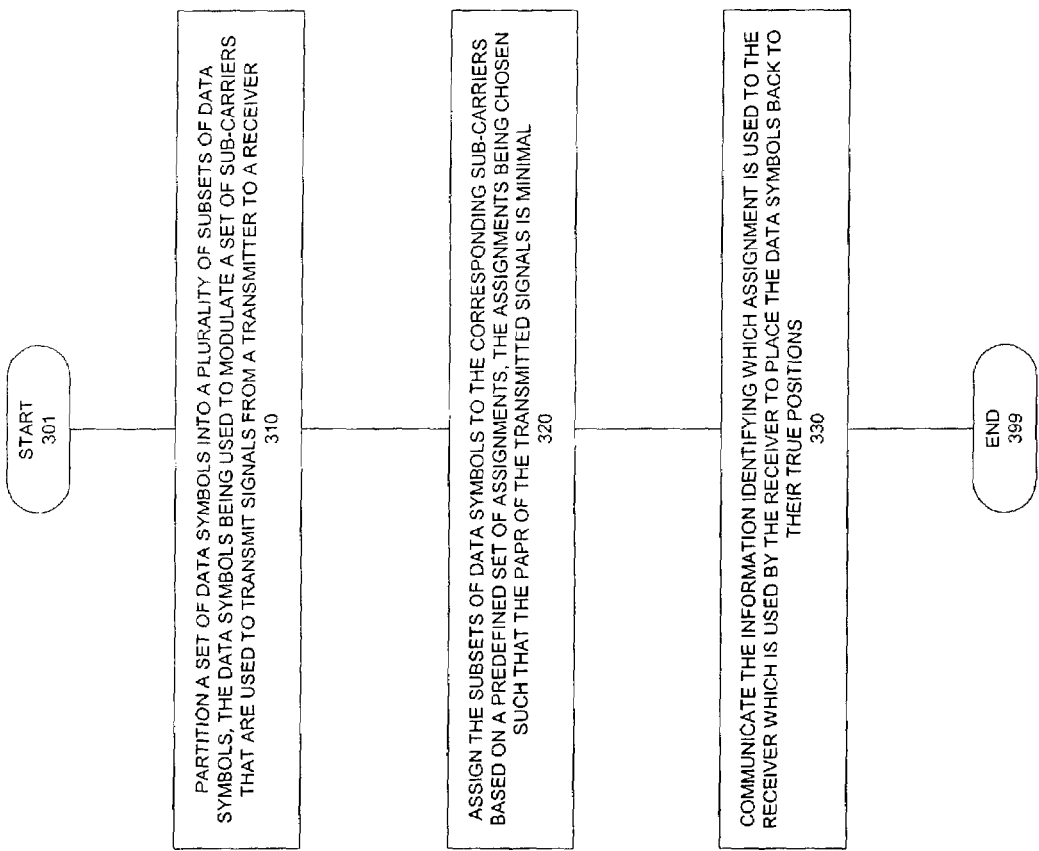
FIG. 3 illustrates a flow diagram of a method according to one embodiment of the invention.

FIG. 3 illustrates a flow diagram of a method in accordance with one embodiment of the present invention. At block 310, a set of data symbols is partitioned into a plurality of subsets. As discussed above, the data symbols are used to QAM modulate the sub-carriers that carry data signals according to the OFDM protocol. In one embodiment, for the 802.11a OFDM application, there are 48 data symbols which are mapped to the sub-carriers. These 48 data symbols, depending on the various applications and implementations of the present invention, can be partitioned into several groups or subsets (e.g., 3 or 4 groups) as described above. At block 320, the subsets of the data symbols are assigned to the corresponding sub-carriers based on a predefined set of assignments. For example, as described above, if the data symbols are partitioned into three groups or subsets A, B, and C, then there are six different assignments that can be used to map the data symbols to the sub-carriers (e.g., ABC, ACB, BCA, BAC, CAB, and CBA). The assignment which results in the minimum PAPR is then chosen. At block 330, the information identifying which assignment is used is communicated to the receiver which then uses this information to place the data symbols back to their true positions. For example, if the BCA assignment is used then this information is communicated to the receiver which then uses this information to place the data symbols back to their true position (i.e., ABC).

Performance Results:

FIGS. 4, 5 and 6 illustrate exemplary results for various simulation conditions based on a computer simulation of the algorithm for signal conditioning as described above. In these examples, the computer simulation of the algorithm is for a 802.11a OFDM system. The following parameters and conditions were used in these simulations:

When signal conditioning is applied, 24 candidate assignments are utilized.

Un-coded, 802.11a formatted, OFDM symbols.

QPSK Modulation.

Single OFDM symbol transmission.

Average over 100 OFDM symbols.

Rapp PA model with p=2.

4 times oversampling.

Time domain OFDM symbol is windowed (raised cosine).

In each of the FIGS. 4, 5, and 6, simulation results are compared with spectral mask requirements of the 802.11a OFDM system.

As can be seen in FIG. 4, with 4.8 dB back-off and no signal conditioning the spectrum is compliant with the 802.11a with no margin. FIG. 5 illustrates the results when the signal conditioning algorithm as described above is used with 24 candidate assignments. It can be seen that with signal conditioning according to the teachings of the present invention, the spectrum is compliant with the 802.11a with significant margin. In order to assess the benefit of using signal conditioning we have decreased the back off with 0.1 dB increments. In FIG. 6, the spectrum with 4.4 dB backoff and signal conditioning according to the teachings of the present invention is illustrated. The margin that is provided by signal conditioning algorithm is no longer visible with 4.4 dB backoff. Thus, in terms of backoff reduction, the signal conditioning as described herein provides at least 0.4 dB performance improvement for the system simulated under the simulation conditions stated.

This reduction in PA back off leads to improved efficiency of the PA and reduced requirements on PA power consumption. This, in turn, leads to reduced requirements on the PA specifications.

In order to see how much efficiency improvement is obtained with the reduced back off, consider FIG. 7 that shows efficiency of a theoretical class A power amplifier vs. back off from output saturation and FIG. 8 that represents a closer look at FIG. 7 in the back off range [−5, −4]. From these FIGS. 7 and 8, it can be seen that if the backoff is reduced from 4.8 dB to 4.4 dB the efficiency of the PA is improved from 16.5% to 18.1%.

A Class A PA operating at 4.8 dB back off theoretically operates at efficiency of 16.5% whereas a PA operating at 4.4 dB back off operates at efficiency of 18.1%. Thus, for 200 mW output, the total energy draw for a PA operating at 4.8 dB back off is (1/0.16.5)*200=1212 mW versus the total energy draw for a PA operating at 3.8 dB back off is (1/0.18.1)*200=1105 mW. Thus, the signal conditioning algorithm as described herein reduces the energy draw by 10%.

The required rating for the PA output power is reduced by 0.4 dB (26%). For example, for an 802.11a compliant transceiver that is designed to operate at lower 2 bands (40 and 200 mW outputs), the PA utilized without signal conditioning should have maximum output power of at least 10^(4.8/10)*200=604 mW (with 4.8 dB back off). However with the signal conditioning according to one embodiment of the invention as described above, a PA with 10^(4.4/10)*200=550 mW maximum output power rating is sufficient (4.4 dB back off). Thus, signal conditioning according to the present invention reduces the required output power rating of the PA by 9%.

With the assumption of negligible power consumption of the transmitter except the PA, and, assuming that the receiver power consumption is much less than the transmitter, signal conditioning technique as described herein can lead up to 10% increased battery life. This saving number is calculated by using the energy drawn with and without signal conditioning and calculating the extended battery life due to reduced energy drawn with signal conditioning. The formula used is:

Increase in battery life=$((x/1105)-(x/1212))/x(1212)$.

Where x is related to total energy stored in the battery and increase in battery life is relative battery life without signal conditioning.

While certain exemplary embodiments have been described and shown in accompanying drawings, it is to be understood that such embodiments are merely illustrative of and not restrictive on the broad invention, and that the invention not be limited to the specific constructions and arrangements shown and described, since various other modifications may occur to those ordinarily skilled in the art.

What is claimed is:

1. A method comprising:

partitioning a set of data symbols having true positions into a plurality of subsets of data symbols, the data symbols being used to modulate a set of sub-carriers, the sub-carriers being used to transmit signals from a transmitter to a receiver;

assigning the subsets of data symbols to the corresponding sub-carriers based on a predefined set of assignments, the assignments being chosen such that a peak to average power ratio (PAPR) of the transmitted signals is minimal; and communicating in a separate channel, information identifying the chosen assignments to the receiver which is used by the receiver to place the data symbols back to the true positions;

wherein, if the assignment of data symbols to the sub-carriers are made by reordering a segment of the data symbol stream that is longer than the number of symbols that can be held by a single OFDM symbol, the assignment information for the respective segment is sent to the receiver embedded in one of the OFDM symbols.

2. A method comprising:

partitioning a set of data symbols having true positions into a plurality of subsets of data symbols, the data symbols being used to modulate a set of sub-carriers, the sub-carriers being used to transmit signals from a transmitter to a receiver;

assigning the subsets of data symbols to the corresponding sub-carriers based on a predefined set of assignments, the assignments being chosen such that a peak to average power ratio (PAPR) of the transmitted signals is minimal; and communicating in a separate channel, information identifying the chosen assignments to the receiver which is used by the receiver to place the data symbols back to the true positions;

wherein, if the assignment of data symbols to the sub-carriers are made by reordering a segment of the data symbol stream that is longer than the number of symbols that can be held by a single OFDM symbol, the assignment information for multiple such segments are sent together to the receiver in one or more OFDM symbols dedicated to communicating the assignment information.

3. A method comprising:

partitioning a set of data symbols having true positions into a plurality of subsets of data symbols, the data symbols being used to modulate a set of sub-carriers, the sub-carriers being used to transmit signals from a transmitter to a receiver;

assigning the subsets of data symbols to the corresponding sub-carriers based on a predefined set of assignments, the assignments being chosen such that a peak to average power ratio (PAPR) of the transmitted signals is minimal; and communicating information identifying the chosen assignments to the receiver which is used by the receiver to place the data symbols back to the true positions;

wherein assigning includes;

for all candidate assignments, assigning the data symbols to the corresponding sub-carriers over a data segment;

performing an Inverse Discrete Fourier Transform (IDFT) function on the respective data segment; and measuring the peak level of the IDFT output; and choosing the assignment with the smallest peak.

4. The method of claim 3 wherein IFFT is used instead of IDFT.

5. The method of claim 3 wherein calculations of signal peak value corresponding to the candidate assignments are performed in parallel.

6. The method of claim 3 wherein calculations of signal peak value corresponding to the candidate assignments are performed sequentially.

* * * * *